United States Patent [19]

Harrison

[11] 4,010,731
[45] Mar. 8, 1977

[54] HEAT STORAGE TANK

[75] Inventor: Henry Harrison, Locust Valley, N.Y.

[73] Assignee: Halm Instrument Co., Inc., Glen Head, N.Y.

[22] Filed: Oct. 23, 1975

[21] Appl. No.: 625,061

[52] U.S. Cl. ............................... 126/271; 126/400
[51] Int. Cl.² ........................ F24J 3/02; F24H 7/00
[58] Field of Search ................. 126/270, 271, 400; 237/1 A; 165/18, 48

[56] References Cited

UNITED STATES PATENTS

| 2,565,676 | 8/1951 | Brodahl | 126/400 |
| 3,236,294 | 2/1966 | Thomason | 126/400 |
| 3,262,493 | 7/1966 | Hervey | 237/1 A |
| 3,400,249 | 9/1968 | Mekjean et al. | 126/400 |
| 3,812,903 | 5/1974 | Thomason | 126/400 |

Primary Examiner—Kenneth W. Sprague
Attorney, Agent, or Firm—James P. Malone

[57] ABSTRACT

A heat storage tank is mounted in a pit in the ground. The pit preferably has four sides and a bottom. A lining of insulating material mounted against the sides of said pit. A water impervious liner tank is mounted against the insulation. A top rests on the contents of the tank. At least one insulating barrier extends down from said top to a point adjacent the bottom of said tank, the barrier dividing said tank into portions. Heat storage material substantially fills the tank. The heat storage material has sufficient voids to permit circulation of heat transfer liquid. A hot liquid intake pipe extends adjacent to the bottom of the tank in the center portion. A cool liquid out-take pipe extends adjacent to the bottom of said tank in a side portion. A heat exchanger is located in the upper center portion of the tank.

8 Claims, 2 Drawing Figures

HEAT STORAGE TANK

This invention relates to heat storage tanks and more particularly to heat storage tank for a house.

In view of the energy shortage, there is a need for means to heating a house while conserving energy. Solar energy heat collectors have been developed which are quite efficient. However, in order to make practical use of them, it is necessary to have some kind of a heat storage system to maintain the heating of the house during nights and periods of cloudy, sunless days.

The present invention provides a heat storage tank which is connected to a solar heat collector to provide sufficient heat storage to obtain practical use of the solar heat collector.

The present invention provides a storage tank which is sunk into the ground. An outer liner of incompressible insulating material is provided. A water impervious liner tank is mounted against the insulation. A top rests on the contents of the tank and the tank is divided into center and side portions by at least one insulating barrier extending from the tank top to a point near the bottom of the tank. Hot water from the heat collector is brought into the center portion. The tank is substantially filled with heat storage material such as gravel and stones and water. The hot water will collect and circulate in the center portion of the tank. Domestic hot water may be heated in a heat exchanger mounted in the upper center portion. Cooler water is pumped from a side portion to the input of the solar heat collector. Some of the heat storage material may be layers or pockets of finer material, such as sand. The gravel and stones have sufficient voids between them to provide for good heat exchange fluid circulation. The heat exchange fluid is preferably water, but other fluid may be used. The heat storage tank of the present invention provides adequate heat storage with a minimum of materials.

Accordingly, a principal object of the invention is to provide new and improved heat storage means.

Another object of the invention is to provide new and improved heat storage means connected to a solar collector as a part of a practical heating system for a house.

Another object of the invention is to provide new and improved heat storage tank requiring a minimum of material and avoiding the need for any heavy structural members.

Another object of the invention is to provide new and improved storage tank wherein the stored heated water is horizontally stratified according to temperature.

Another object of the invention is to provide a new and improved heat storage tank mounted in a pit in the ground, said pit having a continuous side portion and a bottom, a lining of incompressible insulating material mounted against said continuous side portion of said pit, a water impervious liner tank having a continuous side portion and a bottom mounted against said insulating material, a top resting on the contents of said tank, at least one insulating barrier extending down from said top to a point near the bottom of said tank, said barrier dividing said tank into a center portion and at least one side portion, heat storage material substantially filling said tank, said heat storage material having sufficient voids to permit circulation of heat transfer liquid, a hot liquid intake pipe extending adjacent to the bottom of said tank in the center portion thereof, a cool liquid out-take pipe extending adjacent to the bottom of said tank in one of the side portions thereof, and a heat exchanger located in the upper center portion of said tank.

These and other objects of the invention will be apparent from the following specification and drawings, of which:

Figure 1:
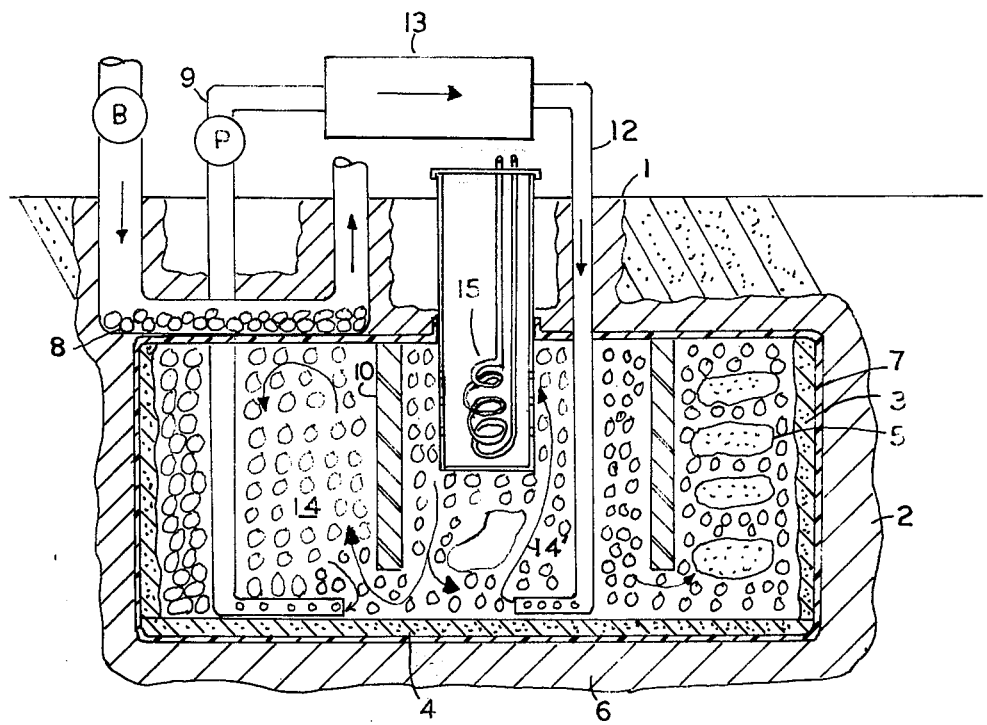
FIG. 1, is a side sectional view of an embodiment of the invention.

Referring to FIG. 1, the heat storage tank is preferably mounted in a pit 1, in the ground. The sides and the bottom of the pit are lined with incompressible insulation 2, which may be a foam material of polystyrene or polyethylene. If the soil is dry and the bottom of the pit is at least several feet above the water table, the bottom portion 6 of the foam insulation may be omitted as the soil itself will provide sufficient insulation. Inside the insulation is mounted a water impervious liner tank 7, which may be of plastic, for instance, of vinyl or polyethylene. The plastic tank liner does not have to have any appreciable structural strength since it is supported by the surrounding earth and the contents of the tank. To prevent puncturing the liner 7 when the tank is being built, a layer of sand 4, a few inches thick is spread on the bottom. Protection for the sides may be a layer 3 of sand, or alternatively of mastic or plastic foam. The top of the tank is covered by a portion of the liner tank 7, and may have a layer of stones 8 which provides an extended heat transfer surface for heating warm air. An insulating barrier 10 extends down from the top, leaving only sufficient space at the bottom for free passage of water. The barrier 10, separates the tank into a center portion and a side portion.

The tank is substantially filled with gravel and stones 14 of reasonably uniform size so that there will be sufficient void spaces between them for a good circulation of water. Finer materials which permit less water circulation may be clumped in layers or pockets 5 which are surrounded by gravel. Earth taken from the pit 1 can frequently be used for filling the tank after it has been screened to develop water circulation voids.

A hot water intake pipe 12, extends down to the bottom of the center portion of the tank. A cold water out-take pipe 9, extends from the bottom side portion up to the top of the tank. A pump P, is connected to the out-take pipe to pump cool water to a heat source 13, which may be a solar heat collector which heats the water. The water then flows down through the pipe 12, and out into the center portion of the tank as shown by the arrow 14'. In the center portion of the tank, the hottest water will rise to the top where it will come in contact with the heat exchange device 15, which will extract the heat for the purpose of providing hot water and heat to the house. The insulating barrier 10, tends to trap the hottest water in the center portion. The coolest water in the center portion flows under the barrier 10 into the side portion. The warmest portion of this water rises to the top, where its heat may pass into the heat exchange rock layer 8 by conduction, there it warms house-heating air circulated by blower B.

The tank for a well-insulated one family dwelling may be approximately 20 × 30 feet and about 5 feet deep. This size tank stores enough heat so that heat collected in summer can be used for winter heating.

For maximum economy, it may be desired to bond at least some of the contents of the tank together with cement. This creates a porous monolithic concrete block with sufficient strength to serve as the foundation for a house. The house is then erected directly on top of the heat storage reservoir.

If the tank actually extends below the water table in the ground it would be desirable to have an additional plastic liner on the outside of the insulation.

In operation, water will be heated by the solar heat collector and pumped down to the center portion of the tank where it will circulate upwardly so that the hottest place in the tank will be the upper center portion. Heat will be extracted from this portion by the heat exchanger 15, when desired.

The present invention provides a heat storage tank of simple construction which requires a minimum amount of materials. No structural members are under any strain. The plastic liner can be of low temperature plastic and it is not subject to any strain because it is supported by sand or gravel on both sides so that it will operate without damage even to boiling water temperature.

The high temperature water is horizontally stratified since it is trapped at the top of the center portion where it is extracted by the heat exchanger.

Figure 2:
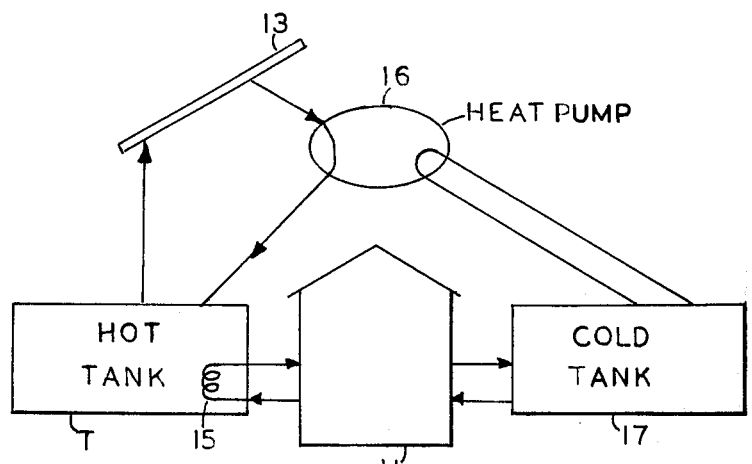
FIG. 2, is a schematic diagram illustrating the use of the invention.

FIG. 2, illustrates the use of the storage tank T, in a complete system. The heat storage tank T is connected to the heat collector 13, and is connected to the house H, by means of heat exchanger 15. The heat pump 16, circulates the heating water. A complete system preferably has a cold storage tank 17, which is connected to the heat pump 16, and the house H, for providing cooling services, such as air conditioning. The cold storage tank may be as described in my co-pending application entitled "COLD STORAGE TANK", Ser. No. 631,057 filed on Nov. 12, 1975.

I claim:

1. A heat storage tank mounted in a pit in the ground, said pit having a continuous side portion and a bottom,
   a lining of incompressible insulating material mounted against said continuous side portion of said pit,
   a liquid-impervious flexible liner tank having a continuous side portion and a bottom mounted against said incompressible insulating material and a top portion resting on the contents of said tank,
   at least one insulating barrier extending down from said top to a point adjacent the bottom of said tank, said barrier dividing said tank into at least a first and a second portion,
   heat storage material substantially filling said tank, said heat storage material having sufficient voids to permit circulation of heat transfer liquid,
   a hot liquid intake pipe extending adjacent to the bottom of said tank in said first portion thereof,
   a cool liquid out-take pipe extending adjacent to the bottom of said tank in said second portion thereof,
   and means for withdrawing heat from the upper part of said first portion of said tank.

2. Apparatus as in claim 1, wherein said heat storage material comprises gravel and stones.

3. Apparatus as in claim 1, wherein said heat storage material comprises gravel and stones and pockets of finer aggregates.

4. Apparatus as in claim 1, wherein said water impervious liner tank is made of plastic sheet.

5. Apparatus as in claim 1, having a solar heat collector, the heat storage tank being connected to the solar heat collector.

6. Apparatus as in claim 1, wherein said means for withdrawing heat is a liquid to liquid heat exchanger immersed in said first portion of said tank.

7. Apparatus as in claim 1, including means for withdrawing heat from the upper part of said second portion of said tank.

8. Apparatus as in claim 2, wherein at least some of said gravel and stones is bonded together with cement, to create a load-bearing porous structure.

* * * * *